United States Patent [19]

Wareing et al.

[11] Patent Number: 4,790,105
[45] Date of Patent: Dec. 13, 1988

[54] PACKAGED PLANT MATERIAL AND METHOD OF PRODUCTION

[75] Inventors: Philip F. Wareing, Dyfed, Wales; Allan C. Cassells, East County Cork, Ireland

[73] Assignee: Research Corporation Limited, London, United Kingdom

[21] Appl. No.: 923,835

[22] PCT Filed: Feb. 3, 1986

[86] PCT No.: PCT/GB86/00058
§ 371 Date: Nov. 26, 1986
§ 102(e) Date: Nov. 26, 1986

[87] PCT Pub. No.: WO86/04563
PCT Pub. Date: Aug. 14, 1986

[30] Foreign Application Priority Data

Feb. 2, 1985 [GB] United Kingdom ............... 8502702

[51] Int. Cl.4 .............................................. A01G 9/02
[52] U.S. Cl. .......................................... 47/84; 47/73; 47/77
[58] Field of Search ............. 47/77, 84, 48.5, 66, 47/69, 73, 84, 86

[56] References Cited

U.S. PATENT DOCUMENTS

| | | | |
|---|---|---|---|
| 3,284,949 | 11/1966 | Park | 47/84 |
| 3,846,954 | 11/1974 | Meyers | 47/48.5 |
| 4,034,508 | 7/1977 | Dedolph | 47/84 |
| 4,124,953 | 11/1978 | Patton | 47/84 |
| 4,170,301 | 10/1979 | Jones et al. | 47/84 |
| 4,189,868 | 2/1980 | Tymchuck et al. | 47/77 |
| 4,209,945 | 7/1980 | Dent et al. | 47/84 |
| 4,407,092 | 10/1983 | Ware | 47/64 |

Primary Examiner—Robert A. Hafer
Assistant Examiner—Charles H. Sam
Attorney, Agent, or Firm—Scully, Scott, Murphy & Presser

[57] ABSTRACT

A pack of seedling plants includes a sealed, sterile dish containing an agar gel in which seedlings have been raised from seed sown in the gel. The pack may also include a growing tray for which a pack of compost may be provided, and a transparent cover which together form a propagator into which seedlings may be transplanted from the dish. The dish may be fixed to a backing and the various components of dish and backing, tray and cover snap fitted one with another to form a convenient package which also has the advantage of being rearrangeable to provide a robust package for the mail-order market.

18 Claims, 3 Drawing Sheets

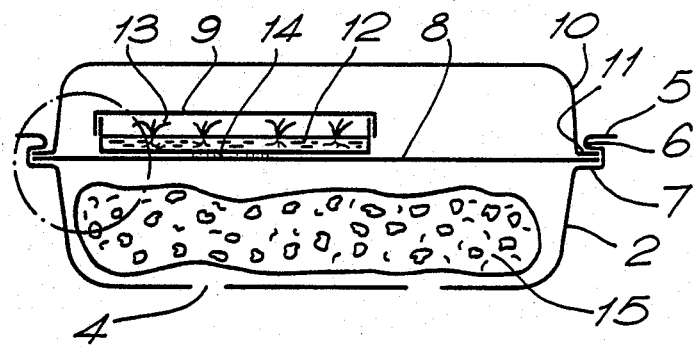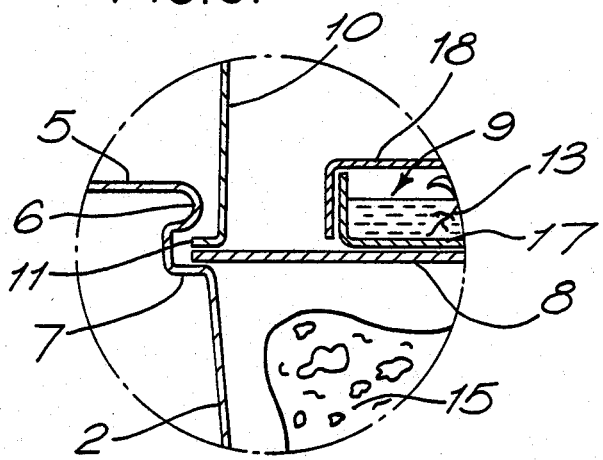

PACKAGED PLANT MATERIAL AND METHOD OF PRODUCTION

This invention relates to a pack of plant source material and to a method of producing same. More particularly, the invention relates to a system for the cultivation, packaging and storing of plant material which provides prepacked plant material for onward cultivation by a purchaser.

In the consumer market, as opposed to commercial agriculture or horticulture, plant material sources of unusual species of plants available to the unskilled grower are in general restricted to seeds and mature plants. Some of the common hardy or half-hardy annuals are available as small plants raised commercially from seed for subsequent bedding out in final growing positions by the purchaser. Such plants are relatively simple to raise to maturity and their cultivation is relatively simple even for the amateur grower with minimum equipment. The less common species and those which are more difficult to grow from seed are considerably more expensive. Examples of such difficult species are the flowering or decoratively-foliaged houseplants which, although their seeds may be available from seed suppliers, are difficult for the unskilled grower to germinate. Seeds often fail to germinate at all or high post-germination losses are incurred because of infection of inexpert cultivation techniques. Such plants are, as a generalisation, available to the consumer market only as mature pot-plants. It will be appreciated that the unit plant cost of a pot plant is significantly greater than plants raised from seed by the amateur himself. In addition, those who produce plants as a hobby are deprived of much of the interest which they derive from cultivating young plants to maturity.

On the commercial scale, pot plants of the less common species may be raised from seed or vegetatively under controlled greenhouse conditions and under expert supervision and are maintained under near ideal conditions until mature. Foliage plant are most commonly propagated vegatatively from cuttings taken from stock plants. When such mature plants are ultimately placed on the market expert supervision may not be readily available; the plants may not be watered or fed as required, they may be stored in insufficiently illuminated locations or in draughts or in a dry centrally heated environment. Losses in locations such as supermarkets and hardware stores, where the sale of house plants is an increasing activity, are high and, of course, the cost of such losses is reflected in the price charged to the customer.

One attempt to provide the unskilled grower with inexpensive plant source material has been the so-called "starter pack" which includes a tray with dry growing medium such as peat-based compost or vermiculite or the like into which seeds have been presown. The purchaser, following instructions provided, adds a specified amount of water and the seeds should thereafter germinate. Apart from any special additives which may be provided in the growing medium, there is no real advantage to the unskilled grower as he is still confronted with the requirement to provide suitable growing conditions such as illumination and temperature to achieve germination and growth. Young seedlings are extremely sensitive to inappropriate cultivation conditions and only achieve any significant degree of hardiness when they have passed the seed leaf stage and acquired at least some adult foliage. In the starter pack system the purchaser of the pack still has the responsibility for nurturing the young plants through this most sensitive period of development.

One process which is available to commercial growers is the tissue culture technique the use of which is increasing. In this technique plants are raised vegatatively in tubes under controlled laboratory conditions of temperature, humidity and illumination. This technique has been used extensively for raising house plants for mass commercial production. It is of particular interest in the multiplication of stocks of new hybrid plants. The plants are propagated vegatatively in elongate tubes containing, as growing medium, an agar gel containing nutrients. The environmental conditions of temperature, humidity and the day/night cycle of illumination are carefully controlled. When the plants reach sufficient maturity they are planted out in their growing positions. Plants produced in this manner require some degree of skill to wean after transplanting to compost. Tissue culture is a labour-intensive activity and costs are, therefore, high.

An object of this invention is to provide a marketable pack of plant source material.

Accordingly, the present invention provides a pack of plant source material including a sealed translucent culture vessel, a sterile gel-type growing medium in the vessel, a plantlet within the vessel and rooted in the said medium, and packaging means comprising a tray, granular growing medium in the tray and a translucent cover for the tray, said packaging means providing a container for the culture vessel and, after manual transplantation of the plantlet from the gel-type medium to the granular medium a propagator for growing for plantlet.

Most preferably the plantlet is a seedling which has been produced from seed sown in the gel-type medium. However, plantlets produced by other means, such as cloning by micropropagation, may be used.

Preferably the gel-type medium is a colourless agar gel which may contain one or more of a plant nutrient, a plant growth regulator, a fungicide, an algacide or other additive having beneficial effect on seed germination or seedling growth. The growth regulator maybe a growth promoter or inhibitor. The gel may also contain polyethylene glycol or other materials which subject the plantlets to osmotic stress which hardens them in preparation for transplanting to compost.

The culture vessel may be a sealed transparent petri dish. The pack may also include a carrier plate having means for adhesively attaching the culture vessel thereto.

The pack include an associated plant propagator for cultivating seedlings placed therein by manual transplantation from the culture vessel, and propagator comprising a tray, granular growing medium in the tray and a translucent, most preferably a colourless transparent, cover for the tray.

The present invention thus provides a pack of plant source material including a sealed translucent culture vessel, an adherent layer of a gel-type growing medium on and coextensive with the vessel base said layer being capable of maintaining its integrity when the vessel is inverted, a carrier plate, means on one surface of the said plate for adhesively attaching the vessel thereto, a tray, means on the tray for clampingly engaging said carrier plate, said carrier plate being invertible so as to hold an adhesively attached vessel in optionally upright or inverted position, a pocket containing granular growing medium stored within the tray and, providing a shock-absorbing cushion for an inverted culture vessel, a translucent cover for the tray, a flange on the cover for clamping engagement with the tray to form therewith, in a first configuration, a plant propagator and adapted to permit, in a second configuration, nesting of the tray within the cover, and a live plantlet within the vessel and rooted in the gel-type medium.

The present invention further provides method of producing a pack of plant source material comprising forming in a culture vessel a layer of sterile gel-type plant culture medium, sterilising seed of a selected plant species, sowing the sterilised seed in the gel-type medium, sealing the vessel to maintain asepsis therein, and germinating the seeds under controlled temperature and illumination conditions.

Generally the seed is sterilised prior to sowing by treatment with sodium hyprochlorite solution or similar materials which have a sterilising effect.

It is also preferred that the gel-type culture medium be an agar gel which may contain one or more of a plant growth regulator, a fungicide, an algacide or other additive having beneficial effect on seed germination or seedling growth.

The agar gel is, generally, of known formulation, containing major and minor inorganic constitutents but for the purpose of this invention sugars are normally omitted.

This invention enables the consumer to benefit inexpensively from expertise in the area of tissue culture which has hitherto been unavailable. Uncommon and therefore expensive, species may thus be made available to a consumer for cultivation to adult size.

Although the method of this invention uses what basically is a tissue culture technique, such technique has only exceptionally been used for germination of seeds. Tissue culture is normally used for vegatative propagation (cloning).

In the method of the invention the seedlings are grown in an aseptic environment which exists in the petri dish. The culture medium is an agar gel of conventional formulation except that sucrose and other organic additives, such as vitamins which are normally present in such gels is, preferably, omitted as its presence encourages rapid spread of any chance fungal infection. One possible source of such infection is fungal spores which may be present beneath the seed coat and so may not be destroyed by the sterilising agent. However, the sterilisation of the seeds by sodium hyprochlorite is effective for most species although there are some problems with, particularly, those having succulent fruits, such as asparagus for which other sterilisers or fungicide may be more effective.

Very small seed, such as those of Saintpaulia and Begonia, may be sown in the gel simply by scattering on the gel suface whereas larger seeds may be placed in selected positions individually.

The culture vessels, containing the sown seed, may be stacked in stacks of five or six, each stack being enclosed in a transparent plastic bag as an additional precaution against infection. Stacks of the vessels may then be laid out on shelves and illuminated by side-lighting provided by fluorescent tubes. To minimise water condensation in the vessels a layer of thermally insulating material may be placed on top of the stacks.

The time taken to germinate and grow the seedlings to a suitable size for marketing is, of course, species dependent and varies from about three to twelve weeks.

The useful shelf life of the pack of the invention can be influenced by the environment in which they are stored. When stored in low light such as normal room lighting or the typical ambient illumination in shops, that is ceiling fluorescent lights at about three metre distance, the shelf life can be six weeks or more for most varieties. For species which are known to be particularly prone to etiolation in low light, it is desirable to provide preventative additives in the gel.

Transplantation of the seedings to a granular compost and growing-on has no particular problems but because the seedlings have been growing in a moisture-laden environment they require to be acclimatised to the less humid growing environment. For this purpose the propagator normally supplied with the pack may be used. Additionally or alternatively the seedlings may be hardened by incorporation into the gel of an additive such as polyethlene glycol to induce osmotic stress to harden the seedlings.

The pack of this invention is particularly convenient for sale in non-specialist stores as it is a sealed, sterile unit. This is a significant consideration for sale in store where soil, such as in pot plants, could not be tolerated for considerations of hygiene.

The invention will now be described by way of illustration, with reference to the accompanying drawings, of which:

FIG. 1. is a general perspective exploded view of a pack in accordance with this invention;

FIG. 2 is a cross-sectional sketch of the pack as shown in FIG. 1;

FIG. 3 is an enlarged view of the detail encircled in FIG. 2;

Figure 1:
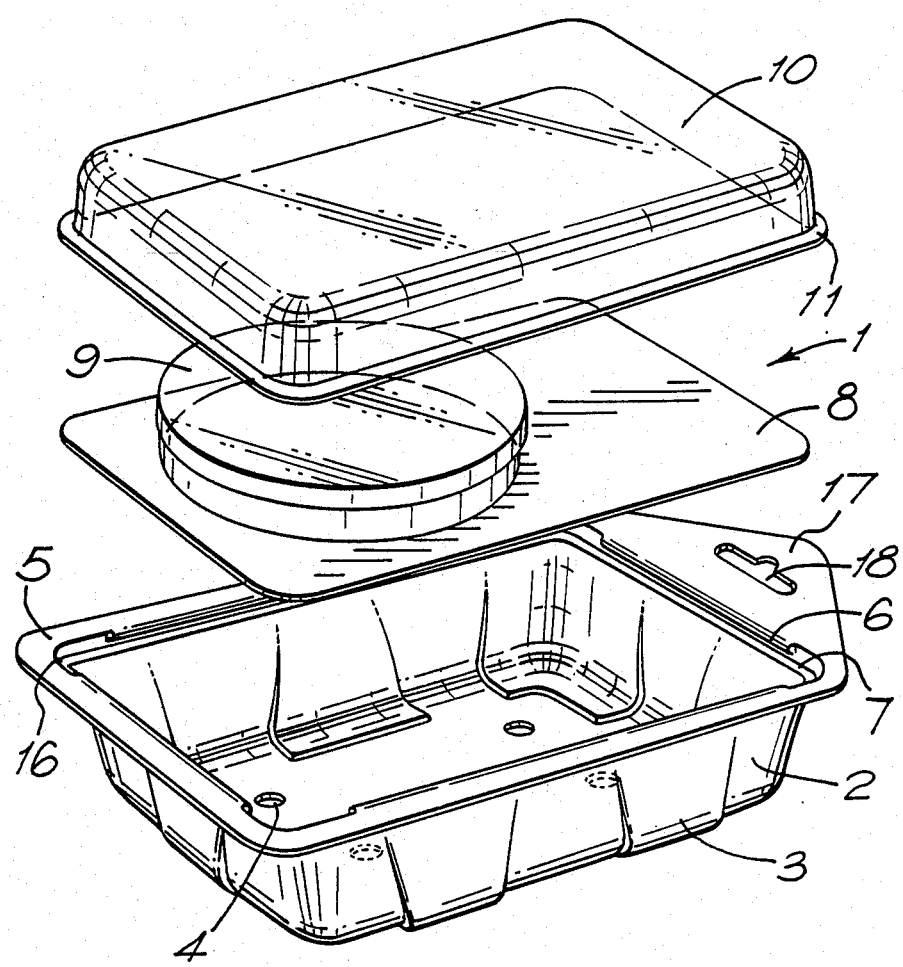

Referring to FIG. 1 of the drawings, a pack 1 of plant source material, has a base section 2 of tray configuration having a preformed strengthening rib 3. The base section 2 provides a plant-growing tray to which end it is provided with water drainage apertures 4. Base section 2 has a flanged rim 5 inwardly extending peripheral shoulder 6 and elongate ledge 7 (shown in more detail in FIGS. 2 and 3) proximate the rim 5.

A carrier plate 8, dimensioned to locate within the base section 2 upon the ledge 7 in snap-fit with shoulder 6, has thereupon an adhesively attached petri dish 9.

A translucent cover 10 having the configuration of an inverted tray, has peripheral flange 11, dimensioned to engage the base section 2 in the same manner as the carrier plate.

Portions of the peripheral ledge 7 are absent at locations 16 such as at the corners of the pack to facilitate insertion and removal of the plate 8 and flange 11 from the base section 2. The pack 1 is also provided with a flange extension 17 on the base section 2 in which an aperture 18 provides means for hanging the pack on a display rack.

FIG. 2 shows in cross-section the normal assembly of parts of the pack of this invention as presented to a customer at the point-of-sale. The carrier plate 8 and flange 11 of the cover 10 are located on the ledge 7 in snap-fit engagement with shoulder 6 of the base section 2. The petri dish 9 contains an adherent layer 12 of agar gel as a growing medium. The petri dish is attached to carrier plate 8 by double-sided adhesive tape 14.

The base section 2 of the assembly provides a container for a package of granular growing compost 15 within a sealed envelope of plastics film material.

FIG. 3 shows an enlarged view of the detail encircled in FIG. 2. The peripheral edge of the carrier plate 8 is pressed manually on to shoulder 6 which then yields to allow the plate 8 to locate on the ledge 7 in snap-fit. The flange 11 of the cover 10 engages in like manner. As indicated in FIG. 1, removal of the cover 10 and the plate 8 is facilitated by the provision of portions 16 where the shoulder 6 is absent. The petri dish 9 has a culture dish 17 and lid 18 and contains the agar layer 12 in which seedlings 13 grow. The lid 18 is retained on the dish 17 by means of adhesive tape (not shown).

Figure 4:
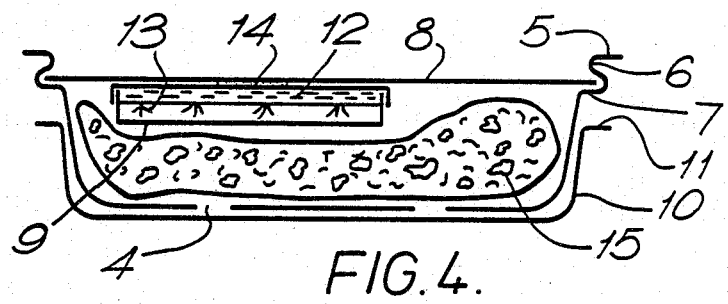
FIG. 4 is a cross-sectional sketch of the pack having its component parts rearranged for mailing.

In FIG. 4, the component parts of the pack are shown in rearranged configuration. The base section 2 rests within inverted cover 10. The carrier plate 8 has also been inverted on the ledge 7 so that the petri dish extends into the base section 2 as illustrated. The package of granular material 15, normally a soft peat-based compost, acts as a cushion for the petri dish 9. The configuration shown in FIG. 4 is compact and sufficiently robust for dispatching through the mail in a commonly available cushioned envelope.

Figure 5:
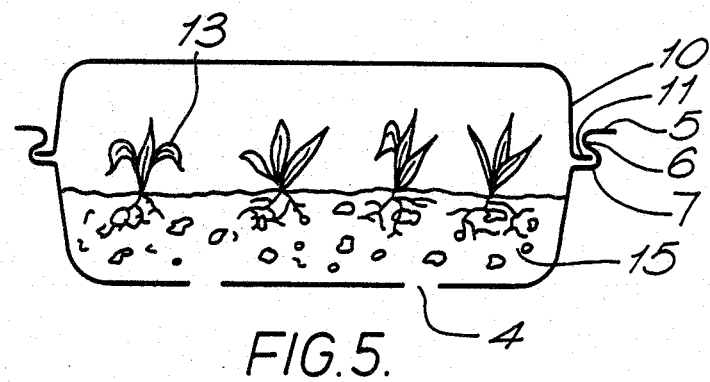
FIG. 5 is a cross-sectional sketch of the pack rearranged for use as a propagator; and, FIG. 6 is a view of a second embodiment of the pack of the invention for use with taller growing plant species.

A purchaser of the pack removes the carrier plate 8 and petri dish 9, places the granular growing medium 15 in the base section 2 and transplants the seedlings 13 from the gel medium 12 to the granular medium 15. The cover 10 is refitted to the base section 2 in the manner hereinbefore described to provide a propagator for onward cultivation of the seedlings. This configuration is shown in FIG. 5.

Figure 6:
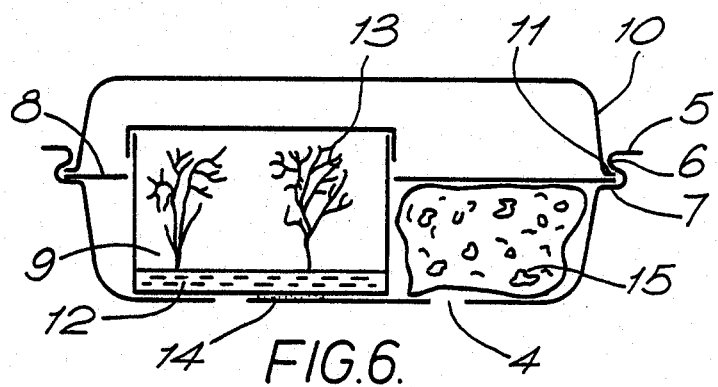

FIG. 6 shows a modification of the pack of the invention for use with certain taller growth species of plants. The petri dish 9 is deeper and, instead of being adhesively attached to the carrier plate 8, it extends through an aperture provided in the plate 8 and is adhesively attached to the base section 2 by adhesive tape 14. It will be appreciated that because of the size of petri dish 9 the modified pack shown in FIG. 6 does not rearrange in the manner shown in FIG. 4. The FIG. 6 embodiment is shipped in the configuration shown.

We claim:

1. A pack for seedling plants including a translucent culture vessel sealed to inhibit moisture loss by evaporation, a layer of a sterile gel-type growing medium in the vessel and adhering to the vessel base, said layer being capable of maintaining its integrity when the vessel is inverted, a live plantlet within the vessel and rooted in said gel-type medium, and packaging means comprising a tray, granular growing medium in the tray and a translucent cover for the tray, said packaging means providing a container for the culture vessel and, after manual transplantation of the living plantlet from the gel-type medium to the granular medium, a propagator for growing the plantlet.

2. A pack as claimed in claim 1 in which the plantlet is a seedling produced by germination of presterilised seed shown in the gel-type medium.

3. A pack according to claim 1 or claim 2, in which the gel-type medium is an agar gel.

4. A pack according to claim 3, in which the agar gel contains one or more of a plant nutrient, a plant growth regulator, a fungicide, an algacide or other additive giving beneficial effect on seed germination or seedling growth.

5. A pack according to claim 4, in which the growth regulator is a growth promotor or inhibitor.

6. A pack according to claim 1 in which the gel contains polyethylene glycol to induce osmotic stress.

7. A pack according to claim 1, in which the culture vessel is a sealed petri dish.

8. A pack according to claim 1, including a carrier plate having means for adhesively attaching the culture vessel thereto.

9. A pack according to claim 8, said tray having a generally flat bottom and upstanding encompassing side wall structure, flange means on the upper ends of said side wall structure including inwardly extending ledge means for engaging the periphery of said translucent cover to detachably fasten said cover to said tray.

10. A pack according to claim 9, in which said carrier plate has said culture vessel fastened thereon, the periphery of said carrier plate being clampingly engaged intermediate said tray ledge means and said cover so as to fixedly position said culture vessel therebetween.

11. A pack according to claim 9, in which at least one of said flange means on said tray includes an outwardly projecting extension, and aperture means formed in said extension to facilitate suspending said pack for purposes of display.

12. A pack according to claim 9, comprising a frangible pocket containing said granular medium being storageable in said tray, said granular medium being removable from said pocket and dispersable in said tray to allow for transplanting said seedlings from the culture vessel into said granular medium in said tray.

13. A pack as claimed in claim 9, wherein said culture vessel is positioned in said pack so as to extend through an opening formed in the carrier plate whereby said culture vessel is supported on the bottom of said tray.

14. A method of producing a pack for seedling plants comprising forming in a culture vessel a layer of sterile gel-type plant culture medium, sterilizing seed of a selected plant species, sowing the sterilized seed in the gel-type medium, sealing the vessel to maintain asepsis therein, and germinating the seeds under controlled temperature and illumination conditions.

15. A method according to claim 14, in which the seed is sterilised prior to sowing by treatment with sodium hypochlorite solution.

16. A method according to claim 14 or claim 15 in which the gel-type medium is an agar gel.

17. A method according to claim 16 in which the agar gel contains one or more of a plant growth regulator, a fungicide, an algacide or other additive having beneficial affect on seed germination or seedling growth.

18. A pack for seedling plants including a sealed translucent culture vessel, an adherent layer of a gel-type growing medium on and coextensive with the vessel base, said layer being capable of maintaining its integrity when the vessel in inverted, a carrier plate, means on one surface of said plate for adhesively attaching the vessel thereto, a tray, means on the tray for clampingly engaging said carrier plate, said carrier plate being invertible so as to hold an adhesively attached vessel in optionally upright or inverted position, a pocket containing granular growing medium stored within the tray and providing a shock-absorbing cushion for an inverted culture vessel, a translucent cover for the tray, a flange on the cover for clamping engagement with the tray to form therewith, in a first configuration, a plant propagator and adapted to permit, in a second configuration, nesting of the tray within the cover, and a live plantlet within the vessel and rooted in the gel-type medium.

* * * * *